May 16, 1967 P. SCHWERIN 3,319,621
SALIVATION TESTING METHODS AND DEVICES
Filed Dec. 18, 1963
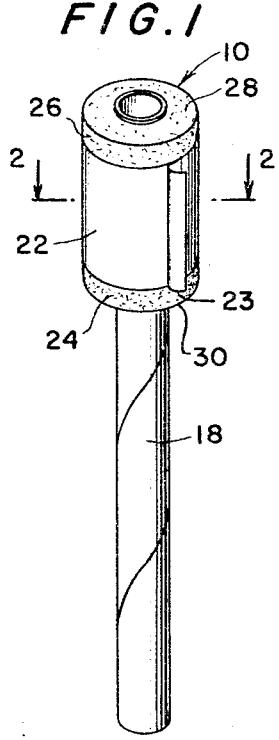
FIG.1
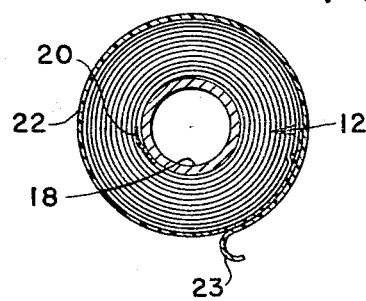
FIG.2
FIG.3
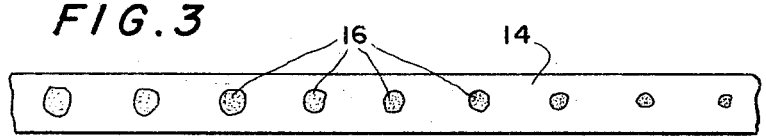
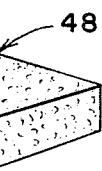
FIG.4
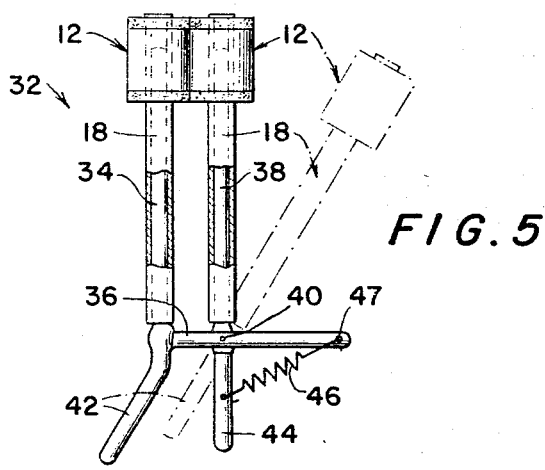
FIG.5
INVENTOR:
PAUL SCHWERIN
BY Harry Cohn
ATTORNEY

United States Patent Office 3,319,621
Patented May 16, 1967

3,319,621
SALIVATION TESTING METHODS AND DEVICES
Paul Schwerin, Dumont, N.J., assignor to Schwerin Research Corporation, New York, N.Y., a corporation of New York
Filed Dec. 18, 1963, Ser. No. 331,482
5 Claims. (Cl. 128—2)

This invention relates to salivation testing methods and devices.

One object of the invention is the provision of an improved salivation testing method and device useful for various purposes, for example but without limitation for determining salivation response to various stimuli, or for testing saliva for diagnostic purposes in respect to quantitative determinations of the type performed in the analysis of blood and other body fluids.

Another object is the provision of a device which is especially well adapted for use in testing the saliva which is discharged from either or both parotid glands.

The above and other objects which might hereinafter appear and the methods and devices of the present invention will be fully understood from the following description considered in connection with the accompanying illustrative drawings.

In the drawings:

FIG. 1 is a perspective view, on an enlarged scale, of a salivation testing device, embodying the present invention;

FIG. 2 is a cross sectional view, on a larger scale, on the line 2—2 of FIG. 1;

FIG. 3 is a view of a length of sheet material forming part of the device shown by FIGS. 1 and 2 and illustrates in part how the device is used;

FIG. 4 is a perspective view of a pad which may be employed as a reagent applicator to the material of the device following the absorption of saliva as indicated by FIG. 3; and FIG. 5 is a side view of an instrument employed in testing saliva from a parotid gland.

Referring now to the drawings in detail, the device 10 shown by FIGS. 1 and 2 comprises a winding or roll 12 of liquid absorptive narrow sheet material adapted to be placed in various positions within a subject's mouth. The absorptive material is preferably a paper web or tape and is non-toxic, odorless and has no taste or flavor. The fibres from which the paper is made are short whereby the path for the travel of moisture longitudinally of the paper web is short so that the penetration of moisture into the paper winding is indicated by sharply delineated moist spots 16 spaced from each other longitudinally of the web as illustarted by FIG. 3. The paper is thin, being known in the trade as ten pound paper tape, and has good wet strength. This paper can be obtained from Aldine Paper Co., Inc., 535 5th Ave., New York 17, N.Y.

The paper roll 12 is wound on and secured to a stiff handle 18 here shown as a slender tube or rod which is preferably formed of cardboard. The inner end of the paper roll is secured in any suitable way as by a short piece 20 of pressure sensitive adhesive tape, for example "Scotch" brand tape. The outer peripheral surface of the paper roll is covered by a layer 22 of such pressure sensitive tape which is releasably secured adhesively to the outermost convolution of the paper roller and is provided with a non-secured outer end portion 23 providing a finger to facilitate the removal of said adhesive from the roll when the latter is to be put to use for its intended purpose.

The covering layer 22 is narrower than the paper of roll 12 and is disposed centrally of the roll axis leaving marginal edge portions 24 and 26 adjacent the opposite sides of the roll. These marginal edge portions and the side surfaces 28 and 30 of the roll are water proofed by rubber cement.

It will be understood that in performing the method of the present invention, the adhesive tape layer 22 is first removed from the test device 10 and the paper roll is placed in the subject's mouth in the desired region of saliva flow from a particular gland or glands or in the oral region of maximum saliva accumulation, depending on the test under performance. It will be understood that the length of time during which the test device is allowed to remain in the mouth is variable according to the technique of the conductor or supervisor of the tests and the characteristics of the product or other source of the salivation stimulus. Ordinarily less than a minute, say 20 to 30 seconds is sufficient for the test. On the other hand, it will be appreciated that the time of the test is a factor to be considered in combination with the depth of absorption to provide a measure of the rate of saliva flow in response to the stimulus.

Ordinarily, in conducting research tests the same salivation experiment or test would be performed on a group of individuals selected and assembled for that purpose, and test devices of identical characteristics would be used for all of the individuals of the group in the same investigation. If, as part of any particular research technique, it is desired to provide a basis for comparison between the salivation response to the product involved in the commercial under investigation and a product or other stimulus which is likely to bring about a different response, the test device of the present invention can of course be utilized; and in such case the devices used for both tests will be of the same character.

As above indicated, the test device of the present invention is especially well adapted for measuring the flow of saliva from a parotid gland. This can be readily accomplished by placing the test device in the subject's mouth with the intermediate part of the paper roll between the marginal edges 24 and 26 in contact with the cheek at the point of saliva flow from said gland. In order to facilitate this operation and provide for uniform pressure of the roll against the cheek, there is provided an instrument 32 presently to be described with reference to FIG. 5.

The test device instrument 32 is a holder and clamp for the test device. Said instrument comprises a rod 34 secured, preferably immovably, to bridge member 36 and a rod 38 which is pivotally mounted on and secured to said bridge member by a pivot pin 40. Rods 34 and 38 have extensions 42 and 44, respectively, which beyond bridge member 36 provide finger pieces for manipulating said rods. A tension spring 46 is connected at one end thereof to extension 44 of movable rod 38 and at its other end to bridge 36 at a point 47 spaced laterally outwardly from the pivotal connection by the pivot pin 40 of movable rod 38 to said bridge member. It will be understood that the test device handles or rods 18 can be solid instead of tubular and that the rods of the instrument 32 can be tubular to slidably receive the solid rods of the test devices therein.

In the use of the test device 10 with the instrument 32, it is convenient to employ two of the test devices which are mounted on rods 34 and 38 by inserting said rods in the tubular handles 18, the latter having a close sliding fit on said rods, respectively. In using the instrument 32 with the devices 10 in place thereon, the rod 38 is pivotally moved clockwise, viewing FIG. 5, by pressing rod extension 44 toward rod extension 42 against the force of tension spring 46, thereby moving the windings 12 away from each other, thereby spacing them in confronting relation to permit the insertion and positioning of one of the windings, say the winding of the device 10 carried by rod 34, into the subject's mouth to engage the inner side of the cheek, at the intended point and without unintentional contact with any other part of the mouth, the other winding being disposed at the outer side of the cheek. When extension 44 is released, spring 46 is operable to resiliently press or clamp the cheek between the two windings 12, the externally positioned winding providing a pad against which the cheek is pressed by the spring loaded rod 38 while the winding 12 within the mouth is concomitantly resiliently pressed against the inner side of the cheek, the covering layer 22 having been removed from winding 12.

Upon removal of the test winding from the subject's mouth, the paper tape is unwound and a reagent, in this case water soluble dye, is applied to the surface of said tape. This is accomplished readily and preferably by sliding a porous pad 48 (FIG. 4) carrying a dry dye powder over the face of the tape. Said dye being water soluble colors the saliva moistened spots 16 (FIG. 3) so that they become clearly visible and can be easily counted.

By counting these spots or by measuring the length of tape which is moistened by saliva, an indication is obtained of the salivation of the subject individual to the stimulus, in the case of tests performed involving a stimulus. On the other hand, when the test device is used in diagnosis, the tape is moistened with a reagent, according to the particular diagnosis, and the reaction product between the reagent and the ingredient under investigation if present in the saliva on the tape can be analyzed quantitatively by counting the spots or by measuring the length of tape having a color which is characteristic of the known reaction product resulting from the application of the reagent to the saliva on the tape.

When the test device of the present invention is used without the instrument 32 and is placed in the mouth under the tongue in the region where saliva collects, the roll is placed under the person's tongue, in front of its roots, and is positioned so that the axis of the roll extends in a cheek-to-cheek direction of the oral cavity and with the handle projects from the roll to the exterior of the mouth. As indicated above in the description of the use of the test device with reference to the parotid gland, the waterproofing of the marginal edges 24 and 26 and the ends of the winding limits the penetration of saliva into the winding at the portions between said waterproofed marginal edges and ends. When the winding is unwound and the dye applied by means of the pad 48, the colored areas indicate the extent of penetration of the saliva into the winding and thereby provides a measure of the salivation response. The rubber cement referred to above for waterproofing the marginal edges and the ends of the winding is of a well-known type which is readily available on the market, one such cement being known as Carter's Rubber Cement for Paper Sticking. The carrier for the rubber cement is highly volatile and evaporates rapidly. It will be understood that the rubber cement is applied as a very thin film to the marginal edges and ends of the winding and is effective to prevent unwinding of the winding when the covering 22 is removed but does not interfere with the unwinding of the convolutions of the test device preliminary to the application of the dye to the moistened areas of the winding.

The subject matter of this application is a further development in respect to the invention disclosed in U.S. Patent No. 2,850,903, granted to me Sept. 9, 1958, for "Salivation Testing Methods and Devices."

While I have shown and described the preferred embodiment of the invention, it will be understood that the invention may be embodied otherwise than as herein specifically illustrated or described and that certain changes in the form and arrangement of parts and in the specific manner of practicing the invention may be made without departing from the underlying idea or principles of this invention within the scope of the appended claims.

What is claimed is:

1. A salivation testing device comprising: a roll of paper tape; the paper of said tape being nontoxic, odorless and tasteless, formed of short fibers, whereby the path for the travel of moisture longitudinally of the tape is short, thin, having good wet strength, and uncoated on both surfaces; said roll comprising a series of convolutions of said paper tape in continuous surface-to-surface contacting relation; the ends of said roll and the adjacent marginal side portions of said roll being moisture proofed whereby penetration of moisture into said roll is confined to radially through the side of said roll intermediate said marginal portions.

2. A device according to claim 1 further including an elongated handle about which said roll is coaxially formed.

3. A device according to claim 1 further including support means secured to said roll for releasably holding said roll in position in the mouth of a subject against the check in the vicinity of the point of saliva flow from the parotid gland.

4. A device according to claim 3 wherein said support means includes an elongated handle for said roll secured inwardly of said roll and extending from said roll, a pad, and an elongated handle secured to said pad and extending therefrom, and spring biasing means coupled to and between said handle for biasing said roll and pad towards each other.

5. A salivation testing method comprising: initially disposing a tape formed of thin paper made of short fibers, nontoxic, odorless and tasteless, having a good wet strength, and uncoated on both surfaces, into a roll with the tape formed into a series of convolutions in continuous surface-to-surface contacting relation; and moisture proofing the ends and the adjacent marginal sdie portions of the roll; subsequently disposing and maintaining the roll of tape within the mouth of the subject; subsequently removing the roll of tape from the mouth of the subject and unrolling the roll; subsequently applying a water-soluble dye to a surface of the unrolled tape to react with any absorbed saliva to effect a measurable change in the appearance of said surface, and measuring said change.

References Cited by the Examiner

UNITED STATES PATENTS

| 2,278,339 | 3/1942 | Vollmer | 128—2 |
| 2,812,757 | 11/1957 | Lusk et al. | 128—2 |
| 2,850,903 | 9/1958 | Schwerin | 128—2 |

RICHARD A. GAUDET, *Primary Examiner.*

SIMON BRODER, *Examiner.*